(12) United States Patent
Kowalchuk

(10) Patent No.: US 11,980,120 B2
(45) Date of Patent: May 14, 2024

(54) AGRICULTURAL PRODUCT STORAGE COMPARTMENT ASSEMBLY HAVING A WEIGHT MONITORING SYSTEM

(71) Applicant: CNH Industrial Canada, Ltd., Saskatoon (CA)

(72) Inventor: Trevor Lawrence Kowalchuk, Saskatoon (CA)

(73) Assignee: CNH Industrial Canada, Ltd. (CA)

( * ) Notice: Subject to any disclaimer, the term of this patent is extended or adjusted under 35 U.S.C. 154(b) by 335 days.

(21) Appl. No.: 17/466,051

(22) Filed: Sep. 3, 2021

(65) Prior Publication Data

US 2023/0074547 A1    Mar. 9, 2023

(51) Int. Cl.
*A01C 15/06* (2006.01)
*A01C 15/00* (2006.01)
*A01C 21/00* (2006.01)

(52) U.S. Cl.
CPC ............ *A01C 15/06* (2013.01); *A01C 15/006* (2013.01); *A01C 21/005* (2013.01)

(58) Field of Classification Search
None
See application file for complete search history.

(56) References Cited

U.S. PATENT DOCUMENTS

| 3,723,989 | A | | 3/1973 | Fathauer et al. |
| 3,727,985 | A | * | 4/1973 | Reuter ................... B65G 53/66 406/25 |
| 3,855,953 | A | | 12/1974 | Fathauer et al. |

(Continued)

FOREIGN PATENT DOCUMENTS

| CA | 2143460 | 10/1995 |
| CA | 2739149 | 5/2012 |

(Continued)

OTHER PUBLICATIONS

Canadian Application No. 3,001,166, Submission Under Section 34.1 of the Patent Act, Jun. 12, 2019, 15 pgs.

(Continued)

*Primary Examiner* — William R Harp
(74) *Attorney, Agent, or Firm* — Rebecca L. Henkel; Peter K. Zacharias; Rickard K. DeMille

(57) ABSTRACT

An agricultural product storage compartment assembly includes a first storage compartment configured to couple to a frame. The first storage compartment is configured to provide a first agricultural product to a first metering assembly. The agricultural product storage compartment assembly also includes a supplemental storage compartment configured to couple to the frame independently of the first storage compartment. In addition, the agricultural product storage compartment assembly includes a first flexible link configured to facilitate flow of the first agricultural product from the supplemental storage compartment to the first storage compartment. Furthermore, the agricultural product storage compartment assembly includes a first valve configured to selectively block flow of a second agricultural product from the supplemental storage compartment to the first storage compartment while the first valve is closed. The agricultural product storage compartment assembly also includes a weight monitoring system.

19 Claims, 3 Drawing Sheets

(56) References Cited

U.S. PATENT DOCUMENTS

| | | | |
|---|---|---|---|
| 3,912,121 A | 10/1975 | Steffen | |
| 4,288,160 A | 9/1981 | Lodzinski | |
| 4,465,211 A | 8/1984 | van der Lely et al. | |
| 4,488,837 A * | 12/1984 | Mizokawa | G01G 11/16 177/16 |
| 4,593,727 A * | 6/1986 | Ulveling | B65G 53/36 177/244 |
| 4,944,428 A | 7/1990 | Gmur et al. | |
| 5,025,951 A | 6/1991 | Hook et al. | |
| 5,323,721 A | 6/1994 | Tofte et al. | |
| 5,384,436 A | 1/1995 | Pritchard | |
| 5,574,657 A | 11/1996 | Tofte et al. | |
| 5,592,889 A * | 1/1997 | Bourgault | A01C 7/081 111/178 |
| 5,902,966 A | 5/1999 | VonMuenster | |
| 6,000,577 A | 12/1999 | Nystrom | |
| 6,091,997 A | 7/2000 | Flamme et al. | |
| 6,148,748 A | 11/2000 | Bardi et al. | |
| 6,150,617 A | 11/2000 | Hart et al. | |
| 6,198,986 B1 | 3/2001 | McQuinn | |
| 6,534,728 B1 | 3/2003 | Spikings | |
| 6,584,920 B1 | 7/2003 | Cresswell | |
| 6,973,843 B2 | 12/2005 | Shyy et al. | |
| 7,104,207 B2 * | 9/2006 | Wake | A01C 7/081 222/129 |
| 7,171,913 B1 | 2/2007 | Conrad | |
| 7,357,087 B2 | 4/2008 | Wilson | |
| 7,765,944 B2 | 8/2010 | Wilson | |
| 8,078,367 B2 | 12/2011 | Sauder et al. | |
| 8,170,825 B2 | 5/2012 | Beaujot et al. | |
| 8,176,797 B2 | 5/2012 | Henry et al. | |
| 8,408,478 B2 | 4/2013 | Wonderlich | |
| 8,683,930 B2 | 4/2014 | Cresswell et al. | |
| 8,695,396 B2 | 4/2014 | Landphair et al. | |
| 8,825,310 B2 | 9/2014 | Kowalchuk | |
| 8,857,745 B2 | 10/2014 | Aral | |
| 9,043,949 B2 | 6/2015 | Liu et al. | |
| 9,578,800 B2 | 2/2017 | Beaujot et al. | |
| 9,781,878 B2 | 10/2017 | Montag | |
| 10,379,547 B2 | 8/2019 | Thompson et al. | |
| 10,406,961 B2 | 10/2019 | Grodecki et al. | |
| 10,569,972 B2 | 2/2020 | Montag et al. | |
| 10,816,382 B2 | 10/2020 | Montag et al. | |
| 10,905,043 B2 | 2/2021 | Altepeter | |
| 11,191,207 B2 | 12/2021 | Harmon et al. | |
| 2006/0255060 A1 | 11/2006 | Miller | |
| 2012/0053726 A1 | 3/2012 | Peters et al. | |
| 2012/0226461 A1 | 9/2012 | Kowalchuk | |
| 2012/0316673 A1 | 12/2012 | Riffel et al. | |
| 2013/0061790 A1 | 3/2013 | Binsirawanich et al. | |
| 2014/0302228 A1 | 10/2014 | Reineccius et al. | |
| 2018/0284735 A1 | 10/2018 | Cella et al. | |

FOREIGN PATENT DOCUMENTS

| | | |
|---|---|---|
| CA | 2755585 | 4/2013 |
| CA | 2967676 | 5/2016 |
| EP | 0537857 | 4/1993 |

OTHER PUBLICATIONS

"SeedMaster air drills and air carts are loaded with technology to get the crop in the ground more easily and efficiently."; Technology Central, SeedMaster, http://www.seedmaster.ca/techcentral.php, last accessed Jan. 17, 2017, 3pgs.

Flexi-Coil P Series Air Carts, New Holland Agriculture, https://assets.cnhindustrial.com/nhag/nar/en-us/assets/pdf/seeding-equipment/flexi-coil-p-series-brochure-us-en.pdf, Jul. 30, 2021, 12 pgs.

Air Cart 660-980, Vaderstad, https://www.vaderstad.com/ca-en/seed-hawk/seed-hawk-air-seeders/air-cart-660-980/, Jul. 30, 2021, 8 pgs.

Knex Integral Tank System, Bourgault, https://www.bourgault.com/product/en-US/7000-series-features-options/715/knex-integral-tank-system.aspx, Jul. 30, 2021, 1 pg.

* cited by examiner

AGRICULTURAL PRODUCT STORAGE COMPARTMENT ASSEMBLY HAVING A WEIGHT MONITORING SYSTEM

BACKGROUND

The present disclosure relates generally to an agricultural product storage compartment assembly having a weight monitoring system.

Generally, seeding implements (e.g., seeders) are towed behind a work vehicle, such as a tractor. Seeding implements typically include multiple row units distributed across a width of the implement. Each row unit is configured to deposit agricultural product, such as seed and/or fertilizer, at a target depth beneath the soil surface of a field, thereby establishing rows of deposited agricultural product. For example, each row unit may include a ground engaging tool or opener that forms a trench for agricultural product deposition into the soil. An agricultural product tube (e.g., coupled to the opener) is configured to deposit the agricultural product (e.g., seed and/or fertilizer) into the trench.

The agricultural product may be stored in multiple storage compartments (e.g., coupled to a frame of the seeding implement or disposed on an air cart) and distributed to each row unit for deposition into the soil. For example, the agricultural product within each storage compartment may be gravity fed into a respective metering assembly, and the metering assembly may control the flow of the agricultural product into pneumatic distribution lines. The pneumatic distribution lines, in turn, may direct the agricultural product to certain row units.

Certain storage compartments include multiple sections separated by removable dividers. For example, a storage compartment may include a first section configured to direct agricultural product to a first metering assembly, a second section configured to direct agricultural product to a second metering assembly, and a third section disposed between the first and second sections. The sections may be separated from one another by removable dividers. By removing one of the removable dividers, the capacity of the first section or the second section may be increased by the capacity of the third section. Unfortunately, because the sections are formed within a single storage compartment, determining the weight of the agricultural product available to the first metering assembly and the weight of the agricultural product available to the second metering assembly may be difficult.

BRIEF DESCRIPTION

In certain embodiments, an agricultural product storage compartment assembly includes a first storage compartment configured to couple to a frame. The first storage compartment is configured to provide a first agricultural product to a first metering assembly. The agricultural product storage compartment assembly also includes a supplemental storage compartment configured to couple to the frame independently of the first storage compartment. In addition, the agricultural product storage compartment assembly includes a first flexible link configured to facilitate flow of the first agricultural product from the supplemental storage compartment to the first storage compartment. Furthermore, the agricultural product storage compartment assembly includes a first valve configured to selectively block flow of a second agricultural product from the supplemental storage compartment to the first storage compartment while the first valve is closed. The agricultural product storage compartment assembly also includes a weight monitoring system having one or more first weight sensors coupled to the first storage compartment and configured to couple to the frame. The one or more first weight sensors are configured to output one or more respective first sensor signals collectively indicative of a weight of the first storage compartment. The weight monitoring system also includes one or more supplemental weight sensors coupled to the supplemental storage compartment and configured to couple to the frame. The one or more supplemental weight sensors are configured to output one or more respective supplemental sensor signals collectively indicative of a weight of the supplemental storage compartment.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
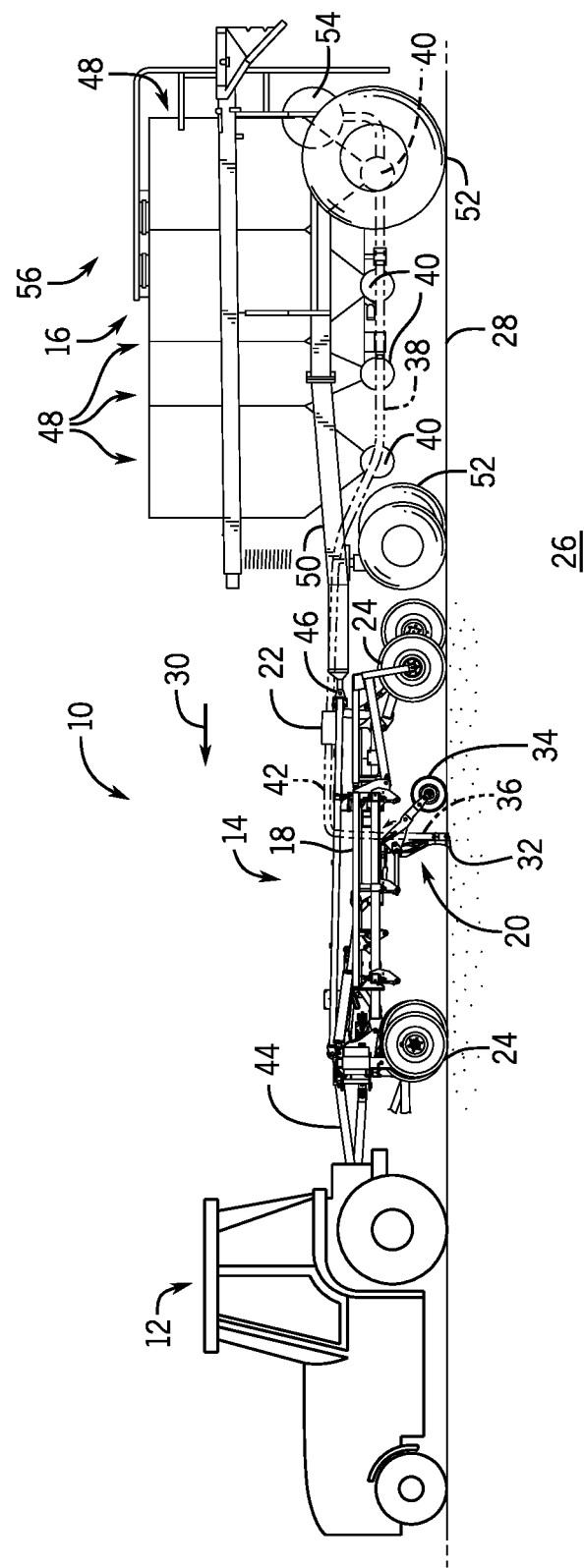
FIG. 1 is a side view of an embodiment of an agricultural system including a work vehicle, an agricultural implement, and an agricultural air cart.

FIG. 1 is a side view of an embodiment of an agricultural system 10 including a work vehicle 12, an agricultural implement 14, and an agricultural air cart 16. As depicted, the agricultural implement 14 includes a tool frame 18 coupled to a row unit 20 (e.g., ground engaging opener assembly), a distribution header 22, and wheel assemblies 24. The agricultural implement 14 is towed by the work vehicle 12 (e.g., a tractor) to deposit rows of agricultural product within soil 26. The wheel assemblies 24 contact a surface 28 of the soil 26 to enable the agricultural implement 14 to be towed by the work vehicle 12 along a direction of travel 30. As the agricultural implement 14 is towed along the direction of travel 30, a row of agricultural product may be deposited into the soil 26 by each row unit 20 (e.g., ground engaging opener assembly). Although only one row unit 20 is shown, the agricultural implement 14 may include multiple row units organized in one or more ranks across the agricultural implement 14. In some embodiments, the agricultural implement may include one or more ranks of twelve or more row units, which may each deposit a respective row of agricultural product into the soil.

To facilitate depositing the agricultural product into the soil 26, each row unit 20 (e.g., ground engaging opener assembly) includes an opener 32, a press wheel 34, and an agricultural product tube 36. While the opener 32 engages the soil 26, the opener 32 exerts a force onto the soil that excavates a trench into the soil as the row unit 20 travels through the field along the direction of travel 30. The agricultural product is deposited into the excavated trench via the agricultural product tube 36. Then, the press wheel 34 packs soil onto the deposited agricultural product. In certain embodiments, the press wheel of at least one row unit may be omitted. For example, at least one press wheel may be mounted to the frame of the agricultural implement behind the respective row unit(s). In certain embodiments, the row unit may also include a residue manager, another suitable ground engaging tool, or a combination thereof. Furthermore, while the illustrated row unit includes an opener, in other embodiments, at least one row unit on the agricultural implement may include an applicator assembly configured to deposit agricultural product onto the surface of the field, or any other suitable type of material deposition assembly. In addition, while the illustrated row unit includes the press wheel, in other embodiments, the press wheel may be omitted from at least one row unit on the agricultural implement.

The header 22 is configured to provide the agricultural product to the row units 20. In some embodiments, the header 22 may pneumatically distribute the agricultural product from a primary line to secondary lines. For example, a primary line 38 may direct agricultural product from the air cart 16 (e.g., from metering assembly/assemblies 40 of the air cart 16) to the header 22. Additionally, the header 22 may distribute the agricultural product to the row units 20 (e.g., to the agricultural product tubes 36 of the row units) via respective secondary lines 42. For example, each secondary line 42 may be fluidly coupled to a respective agricultural product tube 36 (e.g., the secondary line 42 may be integrally formed with the respective agricultural product tube 36). In certain embodiments, multiple primary lines may direct agricultural product to multiple headers. For example, each metering assembly 40 may include multiple metering devices (e.g., meter rollers, augers, etc.), in which each metering device is connected to a respective primary line, and each metering device is configured to independently control flow of the agricultural product to the respective primary line. In addition, multiple secondary lines may extend from each header to respective row units. Furthermore, in certain embodiments, at least one secondary line may extend to a secondary header, and multiple tertiary lines may extend from the secondary header to respective row units.

In the illustrated embodiment, the air cart 16 is towed behind the agricultural implement 14. For example, the agricultural implement 14 may be coupled to the work vehicle 12 by a first hitch assembly 44, and the air cart 16 may be coupled to the agricultural implement 14 by a second hitch assembly 46. However, in other embodiments, the agricultural implement may be towed behind the air cart. In further embodiments, the implement and the air cart may be part of a single unit that is towed behind the work vehicle.

The air cart 16 may centrally store agricultural product and distribute the agricultural product to the headers 22. In the illustrated embodiment, the air cart 16 includes storage compartments 48, a frame 50, wheels 52, and an air source 54. As illustrated, the towing hitch 46 is coupled between the tool frame 18 and the air cart frame 50, which enables the air cart 16 to be towed with the agricultural implement 14. Additionally, the storage compartments 48 are configured to centrally store the agricultural product. In some embodiments, the storage compartments 48 may be configured to store different types of agricultural product. For example, a first storage compartment may store seed while a second storage compartment may store a dry fertilizer. In such configurations, the air cart 16 may deliver both seeds and fertilizer to the implement 14 via separate distribution systems, or as a mixture through a single distribution system.

From the storage compartments 48, the agricultural product may be fed into respective metering assemblies 40, which meter the agricultural product into an airflow provided by the air source 54. The airflow fluidizes the agricultural product for distribution to the headers 22 via the primary lines 38. As depicted, each metering assembly 40 is mounted to the bottom of a respective storage compartment 48. To facilitate distributing the agricultural product, the airflow output by the air source 54 may be guided to the metering assemblies 40 via a plenum and multiple pneumatic lines. In some embodiments, the air source 54 may include one or more pumps and/or blowers powered by electric or hydraulic motor(s), for example.

In certain embodiments (e.g., embodiments in which the air cart is towed behind the agricultural implement), the air source and/or the plenum may be mounted to a rear portion of the air cart (e.g., relative to the direction of travel 30). In other embodiments (e.g., embodiments in which the air cart is towed in front of the implement), the air source and/or the plenum may be mounted to a front portion of the air cart (e.g., relative to the direction of travel 30). Furthermore, in embodiments in which the air cart includes multiple distribution systems, multiple air sources and/or plenums may be utilized. For example, if the air cart includes two separate distribution systems for separately distributing seed and fertilizer to the row units, the air cart may include two air sources and two plenums (e.g., one air source and one plenum for each distribution system). In embodiments in which the air cart includes a single distribution system (e.g., in which one or more agricultural products are metered from one or more metering assemblies into primary lines), a single air source and/or a single plenum may be utilized.

In the illustrated embodiment, the air cart 16 includes an agricultural product storage compartment assembly 56, which includes the storage compartments 48. In certain embodiments, the agricultural product storage compartment assembly 56 includes a first storage compartment coupled to the frame of the air cart, in which the first storage compartment is configured to provide a first agricultural product to a first metering assembly. In addition, the agricultural product storage compartment assembly includes a second storage compartment coupled to the frame of the air cart independently of the first storage compartment. The second storage compartment is configured to provide a second agricultural product to a second metering assembly. The agricultural product storage compartment assembly also includes a third storage compartment coupled to the frame of the air cart independently of the first storage compartment and the second storage compartment. Furthermore, the agricultural product storage compartment assembly includes a first flexible link configured to facilitate flow of the first agricultural product from the third storage compartment to the first storage compartment and a second flexible link configured to facilitate flow of the second agricultural product from the third storage compartment to the second storage compartment. The agricultural product storage compartment assembly also includes a first valve configured to selectively block flow of the second agricultural product from the third storage compartment to the first storage compartment while the first valve is closed and a second valve configured to selectively block flow of the first agricultural product from the third storage compartment to the second storage compartment while the second valve is closed. By opening the first valve and closing the second valve, the amount of first agricultural product available to the first metering assembly may increase by the capacity of the third storage compartment. In addition, by opening the second valve and closing the first valve, the amount of second agricultural product available to the second metering assembly may increase by the capacity of the third storage compartment.

Because the first, second, and third storage compartments are independently coupled to the frame, the weight of each storage compartment may be independently determined. In certain embodiments, the agricultural product storage compartment assembly includes a weight monitoring system. The weight monitoring system includes one or more first weight sensors coupled to the first storage compartment and to the frame, and the one or more first weight sensors are configured to output one or more respective first sensor signals collectively indicative of a weight of the first storage compartment. In addition, the weight monitoring system includes one or more second weight sensors coupled to the second storage compartment and to the frame, and the one or more second weight sensors are configured to output one or more respective second sensor signals collectively indicative of a weight of the second storage compartment. The weight monitoring system also includes one or more third weight sensors coupled to the third storage compartment and to the frame, and the one or more third weight sensors are configured to output one or more respective third sensor signals collectively indicative of a weight of the third storage compartment. Accordingly, the weight of each storage compartment may be independently determined. As a result, a user may be informed of the amount of first agricultural product available to the first metering assembly and the amount of second agricultural product available to the second metering assembly.

While the agricultural product storage compartment assembly is employed within the air cart in the illustrated embodiment, in other embodiments, the agricultural product storage compartment assembly may be employed within the agricultural implement. For example, the storage compartments may be coupled to the frame of the agricultural implement, and the metering assemblies may be coupled to the storage compartments. In addition, the air source(s)/plenum(s) may be coupled to the frame of the agricultural implement.

Figure 2:
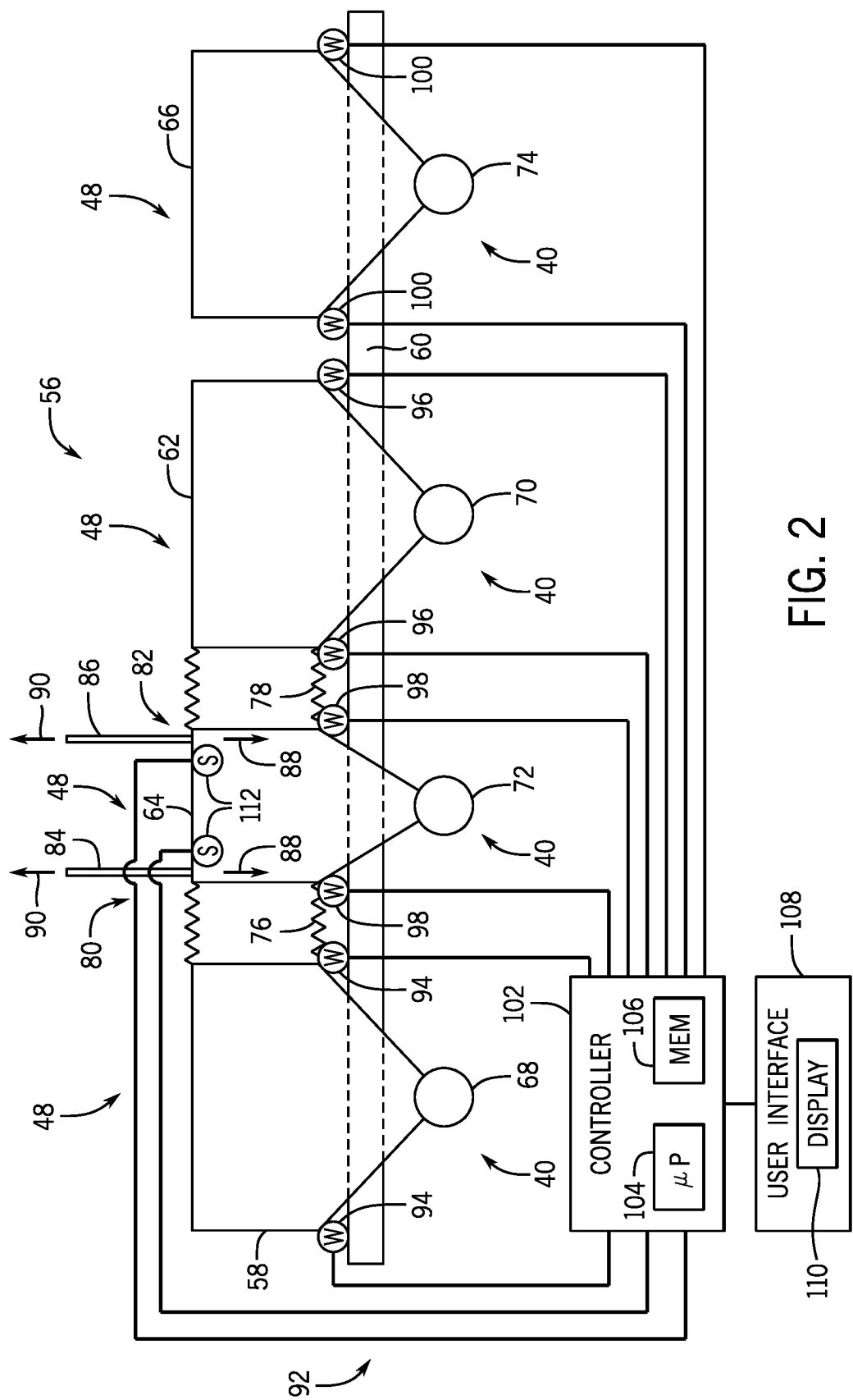
FIG. 2 is a block diagram of an embodiment of an agricultural product storage compartment assembly that may be employed within the agricultural system of FIG. 1.

FIG. 2 is a block diagram of an embodiment of an agricultural product storage compartment assembly 56 that may be employed within the agricultural system of FIG. 1. For example, the agricultural product storage compartment assembly 56 may be employed within the air cart of the agricultural system and/or within the agricultural implement of the agricultural system. As previously discussed, the agricultural product storage compartment assembly 56 includes multiple storage compartments 48, and multiple metering assemblies 40 are coupled to the storage compartments 48. In the illustrated embodiment, the agricultural product storage compartment assembly 56 includes a first storage compartment 58 coupled to a frame 60, a second storage compartment 62 coupled to the frame 60, a third storage compartment 64 (e.g., supplemental storage compartment) coupled to the frame 60, and a fourth storage compartment 66 coupled to the frame 60. Each storage compartment 48 is coupled to the frame 60 independently of the other storage compartments 48. In embodiments in which the agricultural product storage compartment assembly is employed within the air cart, the frame 60 may correspond to the frame of the air cart, and in embodiments in which the agricultural product storage compartment assembly is employed within the agricultural implement, the frame 60 may correspond to the frame of the agricultural implement.

In the illustrated embodiment, the first storage compartment 58 is configured to provide a first agricultural product to a first metering assembly 68 (e.g., including one or more meter rollers, including one or more augers, etc.), and the second storage compartment 62 is configured to provide a second agricultural product to a second metering assembly 70 (e.g., including one or more meter rollers, including one or more augers, etc.). Furthermore, in the illustrated embodiment, the third storage compartment 64 is configured to provide a third agricultural product to a third metering assembly 72 (e.g., including one or more meter rollers, including one or more augers, etc.), and the fourth storage compartment 66 is configured to provide a fourth agricultural product to a fourth metering assembly 74 (e.g., including one or more meter rollers, including one or more augers, etc.). Any of the first, second, third, and fourth agricultural products may be the same as one another and/or, any of the first, second, third, and fourth agricultural products may be different than one another.

While the agricultural product storage compartment assembly 56 includes four storage compartments in the illustrated embodiment, in other embodiments, the agricultural product storage compartment assembly may include more or fewer storage compartments. For example, in certain embodiments, the fourth storage compartment may be omitted. Furthermore, while the third metering assembly 72 is coupled to the third storage compartment 64 in the illustrated embodiment, in other embodiments, the third metering assembly may be omitted. In such embodiments, the third storage compartment may not be configured to output the third agricultural product to a respective metering assembly.

In the illustrated embodiment, the agricultural product storage compartment assembly 56 includes a first flexible link 76 configured to facilitate flow of the first agricultural product from the third storage compartment 64 to the first storage compartment 58. The agricultural product storage compartment assembly 56 also includes a second flexible link 78 configured to facilitate flow of the second agricultural product from the third storage compartment 64 to the second storage compartment 62. Because the flexible links are flexible, weight transfer from the third storage compartment to the first storage compartment and the second storage compartment may be substantially reduced or substantially eliminated (e.g., as compared to a substantially rigid connection between the third storage compartment and the first storage compartment, and/or a substantially rigid connection between the third storage compartment and the second storage compartment). As a result, the weight of each storage compartment may be determined substantially independently.

In the illustrated embodiment, the first flexible link 76 includes a first flexible duct, and the second flexible link 78 includes a second flexible duct. However, in other embodiments, each flexible link may include any suitable device(s) configured to facilitate flow of agricultural product from the third storage compartment to the first/second storage compartment while substantially reducing or substantially eliminating weight transfer from the third storage compartment to the first/second storage compartment (e.g., alone or in combination with the flexible duct), such as a hose, a conduit, another suitable device, or a combination thereof. In certain embodiments, at least one flexible link may include one or more flexible connecting members (e.g., duct(s), hose(s), conduit(s), etc.) each configured to bend/flex. For example, in the illustrated embodiment, each flexible link includes a single flexible duct. Additionally or alternatively, at least one flexible link may include flexible connection(s) between connecting member(s) (e.g., substantially rigid and/or flexible connecting member(s)) and the third storage compartment and/or flexible connection(s) between the connecting member(s) (e.g., substantially rigid and/or flexible connecting member(s)) and the first/second storage compartment. For example, in certain embodiments, at least one flexible link may include substantially rigid connecting member(s) (e.g., pipe(s), etc.), and the substantially rigid connecting member(s) may be coupled to the third storage compartment and/or the first/second storage compartment via flexible connection(s). The flexible connection may include a flexible device (e.g., duct, hose, conduit, etc.) disposed between a connecting member and a respective storage compartment, and/or the flexible connection may include a sliding mechanism (e.g., rail system, track system, etc.) disposed between a connecting member and a respective storage compartment. Furthermore, in certain embodiments, at least one flexible link may only include a sliding mechanism (e.g., rail system, track system, etc.) disposed between the third storage compartment and the first/second storage compartment. In such embodiments, the third storage compartment and the first/second storage compartment may be slidably coupled to one another.

In certain embodiments, the first flexible link 76 is configured to substantially block airflow from an interface between the first storage compartment 58 and the third storage compartment 64. In addition, in certain embodiments, the second flexible link 78 is configured to substantially block airflow from an interface between the second storage compartment 62 and the third storage compartment 64. In certain embodiments, each storage compartment is pressurized (e.g., with airflow from the air source). For example, an air line may extend to each storage compartment to pressurize the storage compartment, or air lines may extend to the first and second storage compartments, and the air from the first/second storage compartment may pressurize the third storage compartment. Because each flexible link is configured to substantially block airflow from the interface between the first/second storage compartment and the third storage compartment, the pressurization of the storage compartments may be substantially maintained. While each flexible link is configured to substantially block airflow from the interface between the first/second storage compartment and the third storage compartment in the illustrated embodiment, in other embodiments (e.g., in embodiments in which the storage compartments are not pressurized), at least one flexible link may not be configured to substantially block airflow from the interface between the first/second storage compartment and the third storage compartment.

In certain embodiments, the agricultural product storage compartment assembly may include one or more active product transfer systems configured to actively transfer the first agricultural product from the third storage compartment to the first storage compartment and/or to actively transfer the second agricultural product from the third storage compartment to the second storage compartment. For example, in certain embodiments, the agricultural product storage compartment assembly may include a first auger configured to drive the first agricultural product to flow from the third storage compartment to the first storage compartment and/or a second auger configured to drive the second agricultural product to flow from the third storage compartment to the second storage compartment. Furthermore, in certain embodiments, the agricultural product storage compartment assembly may include a first belt configured to move the first agricultural product from the third storage compartment to the first storage compartment and/or a second belt configured to move the second agricultural product from the third storage compartment to the second storage compartment.

In the illustrated embodiment, the agricultural product storage compartment assembly 56 includes a first valve 80 and a second valve 82. The first valve 80 is configured to selectively block flow of the second agricultural product from the third storage compartment 64 to the first storage compartment 58 while the first valve 80 is closed. In addition, the first valve 80 is configured to enable flow of the first agricultural product from the third storage compartment 64 to the first storage compartment 58 while the first valve 80 is open. Accordingly, while the first valve 80 is open, the third storage compartment 64 is fluidly coupled to the first storage compartment 58, and while the first valve 80 is closed, the third storage compartment 64 is not fluidly coupled to the first storage compartment 58. Furthermore, the second valve 82 is configured to selectively block flow of the first agricultural product from the third storage compartment 64 to the second storage compartment 62 while the second valve 82 is closed. In addition, the second valve 82 is configured to enable flow of the second agricultural product from the third storage compartment 64 to the second storage compartment 62 while the second valve 82 is open. Accordingly, while the second valve 82 is open, the third storage compartment 64 is fluidly coupled to the second storage compartment 62, and while the second valve 82 is closed, the third storage compartment 64 is not fluidly coupled to the second storage compartment 62.

By way of example, the first valve 80 may be opened, the second valve 82 may be closed, and first agricultural product may be disposed within the third storage compartment 64. Accordingly, the amount of first agricultural product available to the first metering assembly 68 may be equal to the capacity of the first storage compartment 58, the capacity of the third storage compartment 64, and the capacity of the first flexible link 76. In addition, the first valve 80 may be closed, the second valve 82 may be opened, and second agricultural product may be disposed within the third storage compartment 64. Accordingly, the amount of second agricultural product available to the second metering assembly 70 may be equal to the capacity of the second storage compartment 62, the capacity of the third storage compartment 64, and the capacity of the second flexible link 78. Furthermore, the first valve 80 may be closed, the second valve 82 may be closed, and third agricultural product may be disposed within the third storage compartment 64.

Accordingly, the third agricultural product meter 72 may be provided with third agricultural product from the third storage compartment 64.

In the illustrated embodiment, the first valve 80 includes a first removable panel 84 configured to selectively engage the third storage compartment 64. In addition, the second valve 82 includes a second removable panel 86 configured to selectively engage the third storage compartment 64. Each removable panel may be moved in a first direction 88 to selectively engage the third storage compartment 64, thereby blocking a respective opening in the third storage compartment 64. In certain embodiments, the removable panel may then be coupled to the third storage compartment (e.g., via latch(es), via fastener(s), etc.). While the removable panel is engaged with the third storage compartment, flow of agricultural product from the third storage compartment to the first/second storage compartment is blocked. As such, while the removable panel is engaged with the third storage compartment, the respective valve is in the closed position. Furthermore, to enable flow of agricultural product from the third storage compartment 64 to the first storage compartment 58 or the second storage compartment 62, the respective panel may be disengaged from the third storage compartment via movement in a second direction 90, opposite the first direction 88 (e.g., after uncoupling the removable panel from the third storage compartment). Accordingly, while the removable panel is disengaged from the third storage compartment, the respective valve is in the open position.

While each valve includes a respective removable panel configured to selectively engage the third storage compartment in the illustrated embodiment, in other embodiments, at least one valve may include other suitable device(s) configured to selectively block flow of agricultural product from the third storage compartment to the first/second storage compartment (e.g., alone or in combination with the removable panel configured to selectively engage the third storage compartment). For example, in certain embodiments, at least one valve may include a removable panel configured to selectively engage the first/second storage compartment. Furthermore, in certain embodiments, at least one valve may include a rotary panel configured to rotate between a position that enables flow of agricultural product from the third storage compartment to the first/second storage compartment and a position that blocks flow of the agricultural product from the third storage compartment to the first/second storage compartment. In addition, in certain embodiments, at least one valve may include a ball valve, a rotary valve, a slide valve, a movable gate, other suitable type(s) of valve(s), or a combination thereof.

In certain embodiments, the first valve 80 is configured to substantially block airflow between the first storage compartment 58 and the third storage compartment 64 while the first valve 80 is closed. Furthermore, in certain embodiments, the second valve 82 is configured to substantially block airflow between the second storage compartment 62 and the third storage compartment 64 while the second valve 82 is closed. As previously discussed, in certain embodiments, each storage compartment is pressurized (e.g., with airflow from the air source). For example, an air line may extend to each storage compartment to pressurize the storage compartment, or air lines may extend to the first and second storage compartments, and the air from the first/second storage compartment may pressurize the third storage compartment. Because each valve is configured to substantially block airflow between the first/second storage compartment and the third storage compartment while the valve is closed, the first and second storage compartment may be pressurized to different pressures (e.g., with the third storage compartment pressurized to the pressure of the storage compartment fluidly coupled to the third storage compartment). While each valve is configured to substantially block airflow between the first/second storage compartment and the third storage compartment while the valve is closed in the illustrated embodiment, in other embodiments (e.g., in embodiments in which the storage compartments are not pressurized), at least one valve may not be configured to substantially block airflow between the first/second storage compartment and the third storage compartment while the valve is closed.

As previously discussed, in certain embodiments, the third storage compartment 64 is configured to provide the third agricultural product to the third metering assembly 72. In such embodiments, the first valve 80 and the second valve 82 may be closed. Accordingly, an additional storage compartment/metering assembly may be utilized (e.g., for providing another type of agricultural product to the row units of the agricultural implement).

In the illustrated embodiment, the agricultural product storage compartment assembly 56 includes a weight monitoring system 92. The weight monitoring system 92 includes one or more first weight sensors 94 coupled to the first storage compartment 58 and to the frame 60, and the one or more first weight sensors 94 are configured to output one or more respective first sensor signals collectively indicative of a weight of the first storage compartment 58. In addition, the weight monitoring system 92 includes one or more second weight sensors 96 coupled to the second storage compartment 62 and to the frame 60, and the one or more second weight sensors 96 are configured to output one or more respective second sensor signals collectively indicative of a weight of the second storage compartment 62. Furthermore, the weight monitoring system 92 includes one or more third weight sensors 98 (e.g., supplemental weight sensors) coupled to the third storage compartment 64 and to the frame 60, and the one or more third weight sensors 98 are configured to output one or more respective third sensor signals (e.g., supplemental sensor signals) collectively indicative of a weight of the third storage compartment 64. The weight monitoring system 92 also includes one or more fourth weight sensors 100 coupled to the fourth storage compartment 66 and to the frame 60, and the one or more fourth weight sensors 100 are configured to output one or more respective fourth sensor signals collectively indicative of a weight of the fourth storage compartment 66. In embodiments in which the fourth storage compartment is omitted, the fourth weight sensors may also be omitted. The weight of the storage compartment may include the total weight of the storage compartment structure and the agricultural product contained within the storage compartment, or the weight of the storage compartment may include the weight of the agricultural product within the storage compartment alone (i.e., without the weight of the storage compartment structure). Furthermore, if flexible link(s) are coupled to the storage compartment, the weight of the storage compartment may include the total weight of the storage compartment structure, the agricultural product contained within the storage compartment, the portion(s) of the flexible link structure(s) supported by the storage compartment, and the portion(s) of the agricultural product(s) that are within the flexible link(s) and supported by the storage compartment, or the weight of the storage compartment may include the total weight of the agricultural product within the storage compartment and the portion(s) of the agricultural product(s) that are within the flexible link(s) and supported by the storage compartment.

In the illustrated embodiment, two weight sensors are coupled to each storage compartment. Accordingly, the two weight sensors are configured to output respective sensor signals collectively indicative of the weight of the respective storage compartment. Each weight sensor may output a respective sensor signal indicative of a portion (e.g., about half for embodiments including two weight sensors) of the weight of the respective storage compartment. The portions of the weight may be combined to determine the total weight of the respective storage compartment. While two weight sensors are coupled to each storage compartment in the illustrated embodiment, in other embodiments, more or fewer weight sensors (e.g., 1, 3, 4, 5, 6, 7, 8, or more) may be coupled to at least one storage compartment.

Each weight sensor may include any suitable device configured to output a sensor signal indicative of a monitored weight. For example, in certain embodiments, at least one first weight sensor of the one or more first weight sensors 94 may include a first load cell, at least one second weight sensor of the one or more second weight sensors 96 may include a second load cell, at least one third weight sensor of the one or more third weight sensors 98 may include a third load cell, or a combination thereof. Furthermore, in certain embodiments, at least one fourth weight sensor of the one or more fourth weight sensors may include a fourth load cell. Additionally or alternatively, at least one weight sensor may include a strain gauge, a piezoelectric sensor, or another suitable type of sensor. For example, in certain embodiments, at least one weight sensor may include one or more hydraulic cylinders and a fluid pressure sensor. In such embodiments, the hydraulic cylinder(s) may be coupled to the respective storage compartment and to the frame, and the hydraulic cylinder(s) may support the weight of the respective storage compartment/portion of the weight of the respective storage compartment. The hydraulic cylinder(s) may be fluidly coupled to the fluid pressure sensor, and the fluid pressure sensor may monitor the fluid pressure within the hydraulic cylinder(s). The fluid pressure sensor may output one or more sensor signals indicative of the weight of the respective storage compartment/portion of the weight of the respective storage compartment.

In the illustrated embodiment, the weight monitoring system 92 includes a controller 102 communicatively coupled to the one or more first weight sensors 94, to the one or more second weight sensors 96, to the one or more third weight sensors 98, and to the one or more fourth weight sensors 100. The controller 102 is configured to determine the weights of the storage compartments based on the sensor signals. In certain embodiments, the controller 102 is an electronic controller having electrical circuitry configured to receive the sensor signals and determine the weights of the storage compartments. In the illustrated embodiment, the controller 102 includes a processor, such as the illustrated microprocessor 104, and a memory device 106 (e.g., memory). The controller 102 may also include one or more storage devices and/or other suitable component(s). The processor 104 may be used to execute software, such as software for determining the weights of the storage compartments, and so forth. Moreover, the processor 104 may include multiple microprocessors, one or more "general-purpose" microprocessors, one or more special-purpose microprocessors, and/or one or more application specific integrated circuits (ASICs), or some combination thereof. For example, the processor 104 may include one or more reduced instruction set (RISC) processors.

The memory device 106 may include a volatile memory, such as random access memory (RAM), and/or a nonvolatile memory, such as read-only memory (ROM). The memory device 106 may store a variety of information and may be used for various purposes. For example, the memory device 106 may store processor-executable instructions (e.g., firmware or software) for the processor 104 to execute, such as instructions for determining the weights of the storage compartments, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for determining the weights of the storage compartments, etc.), and any other suitable data.

In the illustrated embodiment, the weight monitoring system 92 includes a user interface 108 communicatively coupled to the controller 102. The user interface 108 is configured to receive input from a user and to provide information to the user. The user interface 108 may include any suitable input device(s) for receiving input, such as a keyboard, a mouse, button(s), switch(es), knob(s), other suitable input device(s), or a combination thereof. In addition, the user interface 108 may include any suitable output device(s) for presenting information to the user, such as a speaker, indicator light(s), other suitable output device(s), or a combination thereof. In the illustrated embodiment, the user interface 108 includes a display 110 configured to present visual information to the user. In certain embodiments, the display 110 may include a touchscreen interface configured to receive input from the user.

In certain embodiments, the controller 102 may receive the one or more first sensor signals from the one or more first weight sensors 94, the one or more second sensor signals from the one or more second weight sensors 96, and the one or more third sensor signals from the one or more third weight sensors 98. Furthermore, in certain embodiments, the controller 102 may receive the one or more fourth sensor signals from the one or more fourth weight sensors 100. The controller may then determine the weight of the first storage compartment 58 based on the one or more first sensor signals, the weight of the second storage compartment 62 based on the one or more second sensor signals, and the weight of the third storage compartment 64 based on the one or more third sensor signals. In addition, in certain embodiments, the controller 102 may determine the weight of the fourth storage compartment 66 based on the one or more fourth sensor signals. For example, to determine the weight of each storage compartment, the controller 102 may add the portion(s) of the weight monitored by the weight sensor(s) coupled to the respective storage compartment to one another. In certain embodiments (e.g., in embodiments in which a flexible link is not coupled to the storage compartment), the controller 102 may subtract the weight of the respective storage compartment structure (e.g., which may be stored in the memory 106 or the storage device) to determine the weight of the storage compartment, such that the weight of the storage compartment represents the weight of the agricultural product within the storage compartment. Furthermore, in certain embodiments (e.g., in embodiments in which flexible link(s) are coupled to the storage compartment), the controller 102 may subtract the weight of the respective storage compartment structure and the portion(s) of the weight(s) of the flexible link structure(s) supported by the storage compartment (e.g., which may be stored in the memory 106 or the storage device) to determine the weight of the storage compartment, such that the weight of the storage compartment represents the weight of the agricultural product within the storage compartment and the portion(s) of the weight(s) of the agricultural product(s) that are within the flexible link(s) and supported by the storage compartment. Because each storage compartment is independently coupled to the frame and because the flexible links are flexible, the weight of each storage compartment may be determined substantially independently.

Once the weight of each storage compartment is determined, the controller 102 may output one or more output signals indicative of the weight of the first storage compartment, the weight of the second storage compartment, the weight of the third storage compartment, or a combination thereof. Furthermore, in certain embodiments, the controller 102 may also output one or more output signals indicative of the weight of the fourth storage compartment. The output signals may be received by the user interface 108, and the user interface may present indication(s) of the weight(s) of the storage compartment(s) to the user (e.g., visually via the display 110). Furthermore, in certain embodiments, another suitable device (e.g., a remote server, a handheld device, a controller of another vehicle, etc.) may receive the output signal(s) indicative of the weight(s) of the storage compartment(s).

In certain embodiments, the controller 102 is configured to receive one or more selection signals indicative of whether the third storage compartment 64 is fluidly coupled to the first storage compartment 58 or the third storage compartment 64 is fluidly coupled to the second storage compartment 62. In certain embodiments, the user interface 108 is configured to output the one or more selection signals in response to user input. For example, the user may manually open the first valve 80, manually close the second valve 82, and provide an input to the user interface 108 indicative of fluid coupling between the third storage compartment 64 and the first storage compartment 58. Furthermore, the user may manually close the first valve 80, manually open the second valve 82, and provide an input to the user interface 108 indicative of fluid coupling between the third storage compartment 64 and the second storage compartment 62. The controller 102 may determine whether the third storage compartment 64 is fluidly coupled to the first storage compartment 58 or the third storage compartment 64 is fluidly coupled to the second storage compartment 62 based on the one or more selection signals.

Additionally or alternatively, the weight monitoring system 92 may include one or more valve sensors 112 configured to output the one or more selection signals based on a state/position of the first valve 80 and a state/position of the second valve 82. For example, in certain embodiments, the weight monitoring system 92 may include a first valve sensor 112 configured to monitor the state/position of the first valve 80 and a second valve sensor 112 configured to monitor the state/position of the second valve 82. In response to the first valve 80 being open and the second valve 82 being closed, the controller 102 may determine the third storage compartment 64 is fluidly coupled to the first storage compartment 58, and in response to the first valve 80 being closed and the second valve 82 being open, the controller 102 may determine the third storage compartment 64 is fluidly coupled to the second storage compartment 62. The valve sensor(s) 112 may include any suitable device(s) configured to determine the state/position of the valves, such as contact switch(es), potentiometer(s), linear variable differential transformer(s), optical sensor(s), ultrasonic sensor(s), inductive sensor(s), proximity sensor(s), other suitable type(s) of sensor(s), or a combination thereof. While the weight monitoring system 92 includes valve sensor(s) 112 in the illustrated embodiment, in other embodiments (e.g., in embodiments in which the user interface is configured to output the one or more selection signals in response to user input), the valve sensor(s) may be omitted.

In certain embodiments, the valves may be controlled by respective actuators. In such embodiments, the actuators may be communicatively coupled to the controller, and the controller may receive the one or more selection signals from the user interface, as previously discussed. In response to receiving the one or more selection signals, the controller may control the actuators to adjust the state/position of the valves. As a result, manual/physical actuation of the valves may be obviated.

In response to determining the third storage compartment 64 is fluidly coupled to the first storage compartment 58, the controller 102 may determine a first combined weight of the first storage compartment 58 and the third storage compartment 64, such as by adding the weight of the first storage compartment 58 to the weight of the third storage compartment 64. In certain embodiments, the weights of the first and third storage compartments may represent the total weights of the storage compartments (e.g., including the weight of the storage compartment structure, the weight of the agricultural product contained within the storage compartment, the portion(s) of the weight(s) of the flexible link structure(s) supported by the storage compartment, and the portion(s) of the weight(s) of the agricultural product(s) that are within the flexible link(s) and supported by the storage compartment). In such embodiments, the controller 102 may determine the first combined weight by adding the weight of the first storage compartment to the weight of the third storage compartment, subtracting the weight of the first storage compartment structure, subtracting the weight of the third storage compartment structure, subtracting the weight of the first flexible link structure, and subtracting the portion of the weight of the second flexible link supported by the third storage compartment. Once the first combined weight is determined, the controller 102 may output one or more output signals (e.g., first output signals) indicative of the first combined weight and the weight of the second storage compartment (e.g., the weight of the second agricultural product within the second storage compartment).

In addition, in response to determining the third storage compartment 64 is fluidly coupled to the second storage compartment 62, the controller 102 may determine a second combined weight of the second storage compartment 62 and the third storage compartment 64, such as by adding the weight of the second storage compartment 62 to the weight of the third storage compartment 64. In certain embodiments, the weights of the second and third storage compartments may represent the total weights of the storage compartments (e.g., including the weight of the storage compartment structure, the weight of the agricultural product contained within the storage compartment, the portion(s) of the weight(s) of the flexible link structure(s) supported by the storage compartment, and the portion(s) of the weight(s) of the agricultural product(s) that are within the flexible link(s) and supported by the storage compartment). In such embodiments, the controller 102 may determine the second combined weight by adding the weight of the second storage compartment to the weight of the third storage compartment, subtracting the weight of the second storage compartment structure, subtracting the weight of the third storage compartment structure, subtracting the weight of the second flexible link structure, and subtracting the portion of the weight of the first flexible link supported by the third storage compartment. Once the second combined weight is determined, the controller 102 may output one or more output signals (e.g., second output signals) indicative of the second combined weight and the weight of the first storage compartment (e.g., the weight of the first agricultural product within the first storage compartment).

The one or more output signals may be received by the user interface 108, and the user interface may present indication(s) of the weight(s) to the user (e.g., visually via the display 110). For example, the user interface 108 may present an indication of at least one of the first combined weight, the second combined weight, the weight of the second storage compartment, or the weight of the first storage compartment. For example, in response to determining the third storage compartment is fluidly coupled to the first storage compartment, the user interface 108 may present an indication of the first combined weight and an indication of the weight of the second storage compartment. As a result, the user may be informed of the amount of first agricultural product available to the first metering assembly and the amount of second agricultural product available to the second metering assembly. In addition, in response to determining the third storage compartment is fluidly coupled to the second storage compartment, the user interface 108 may present an indication of the second combined weight and an indication of the weight of the first storage compartment. As a result, the user may be informed of the amount of first agricultural product available to the first metering assembly and the amount of second agricultural product available to the second metering assembly. Furthermore, in certain embodiments, another suitable device (e.g., a remote server, a handheld device, a controller of another vehicle, etc.) may receive the output signal(s) indicative of the weight(s).

In certain embodiments, the controller 102 of the weight monitoring system 92 is configured to perform a calibration check and, in certain embodiments, a calibration adjustment for one or more of the metering assemblies 40. For example, in response to determining the third storage compartment is fluidly coupled to the first storage compartment, the controller 102 may perform a calibration check for the first metering assembly 68. The calibration check process may include determining a first calibration flow rate of the first agricultural product through the first metering assembly 68 based on a first calibration. The first calibration may be used by a controller (e.g., the controller 102) during operation of the agricultural system to control rotation rate(s) of meter roller(s)/auger(s) within the first metering assembly (e.g., based on a speed of the agricultural implement and a target agricultural product flow rate), and the first calibration may be determined via a manual or automated metering assembly calibration process (e.g., performed prior to seeding operations). In certain embodiments, the first calibration flow rate may be determined based on the first calibration, rotation rate(s) of meter roller(s)/auger(s) within the first metering assembly, an extent of the row units along a lateral axis of the agricultural implement, and a speed of the agricultural implement. The calibration check process may also include determining a first determined flow rate of the first agricultural product through the first metering assembly based on a change in the first combined weight. For example, an area swept by row units that receive the first agricultural product from the first metering assembly over a period of time may be determined (e.g., based on an extent of the row units along a lateral axis of the agricultural implement and a speed of the agricultural implement). The change in the first combined weight may also be determined over the period of time. The first determined flow rate may then be determined by dividing the change in the first combined weight by the swept area. Furthermore, the calibration check process may include determining whether a first difference between the first calibration flow rate and the first determined flow rate is greater than a first threshold value (e.g., indicative of an undesirable flow rate variation). In addition, the calibration check process may include outputting a first calibration signal in response to determining the first difference is greater than the first threshold value. The user interface may receive the first calibration signal and, in response, provide an indication to the operator indicative of an undesirable flow rate variation. In certain embodiments, the operator may manually adjust the first calibration to reduce the flow rate variation.

Furthermore, in response to determining the third storage compartment is fluidly coupled to the second storage compartment, the controller 102 may perform a calibration check for the second metering assembly 70. The calibration check process may include determining a second calibration flow rate of the second agricultural product through the second metering assembly 70 based on a second calibration. The second calibration may be used by a controller (e.g., the controller 102) during operation of the agricultural system to control rotation rate(s) of meter roller(s)/auger(s) within the second metering assembly (e.g., based on a speed of the agricultural implement and a target agricultural product flow rate). The calibration check process may also include determining a second determined flow rate of the second agricultural product through the second metering assembly based on a change in the second combined weight. Furthermore, the calibration check process may include determining whether a second difference between the second calibration flow rate and the second determined flow rate is greater than a second threshold value (e.g., indicative of an undesirable flow rate variation). In addition, the calibration check process may include outputting a second calibration signal in response to determining the second difference is greater than the second threshold value. The user interface may receive the second calibration signal and, in response, provide an indication to the operator indicative of an undesirable flow rate variation. In certain embodiments, the operator may manually adjust the second calibration to reduce the flow rate variation. While the calibration check process is described above with regard to the first metering assembly while the third storage compartment is fluidly coupled to the first storage compartment and the second metering assembly while the third storage compartment is fluidly coupled to the second storage compartment, the calibration check process may also be performed for the third metering assembly, the fourth metering assembly, the first metering assembly while the third storage compartment is fluidly coupled to the second storage compartment, and the second metering assembly while the third storage compartment is fluidly coupled to the first storage compartment.

Furthermore, in certain embodiments, in response to determining the third storage compartment is fluidly coupled to the first storage compartment and the first difference is greater than the first threshold value, the controller 102 may update the first calibration based on the first difference. For example, the controller may determine a percentage difference based on the first difference (e.g., by dividing the first difference by the first calibration flow rate) and multiply the percentage difference by the first calibration to determine an updated first calibration. The controller may use the updated first calibration to control rotation rate(s) of the meter roller(s)/auger(s) within the first metering assembly. In addition, in response to determining the third storage compartment is fluidly coupled to the second storage compartment and the second difference is greater than the second threshold value, the controller 102 may update the second calibration based on the second difference (e.g., via the technique disclosed above with regard to the first calibration). Furthermore, in embodiments in which the calibration check process is performed for another metering assembly, the calibration update process may also be performed for the metering assembly.

While the third storage compartment 64 is configured to selectively fluidly couple to the first storage compartment 58 and the second storage compartment 62 in the illustrated embodiment, in other embodiments, the third storage compartment may only be configured to selectively fluidly couple to a single storage compartment (e.g., the first storage compartment). In such embodiments, the agricultural product storage compartment assembly may include a single flexible link and a single valve. In addition, the controller may determine the combined weight of the two storage compartments in response to determining the two storage compartments are fluidly coupled. Furthermore, in certain embodiments, the third storage compartment may be configured to selectively fluidly couple to three or more storage compartments (e.g., the first storage compartment, the second storage compartment, and the fourth storage compartment). In such embodiments, the agricultural product storage compartment assembly may include a number of flexible links and a number of valves equal to the number of storage compartments selectively fluidly coupled to the third storage compartment. In addition, the controller may determine the combined weight of the third storage compartment and the other storage compartment fluidly coupled to the third storage compartment in response to determining the third storage compartment is fluidly coupled to the other storage compartment. Furthermore, in certain embodiments, the agricultural product storage compartment assembly may include additional supplemental storage compartment(s), and respective flexible link(s) may extend between each supplemental storage compartment and other storage compartment(s). In addition, respective valve(s) may be configured to selectively block flow of agricultural product between each supplemental storage compartment and the other storage compartment(s). Furthermore, the weight monitoring system may include one or more weight sensors for each storage compartment, and the controller may determine the combined weight of the supplemental storage compartment and the other storage compartment fluidly coupled to the third storage compartment in response to determining the third storage compartment is fluidly coupled to the other storage compartment.

Figure 3:
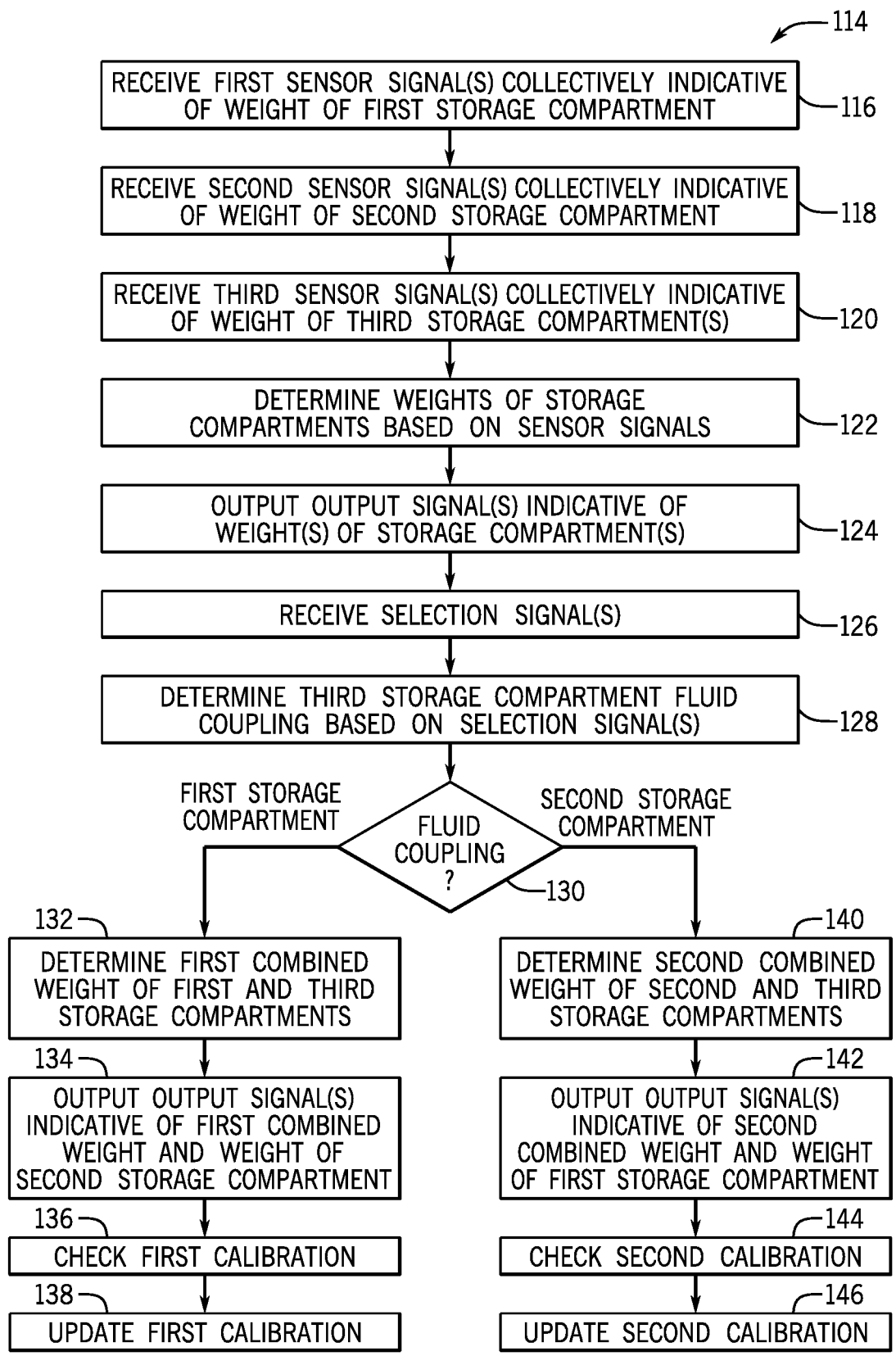
FIG. 3 is a flow diagram of an embodiment of a method for determining weights within an agricultural product storage compartment assembly.

FIG. 3 is a flow diagram of an embodiment of a method 114 for determining weights within an agricultural product storage compartment assembly. The method 114 may be performed by the controller disclosed above with referenced to FIG. 2 or any other suitable controller(s). Furthermore, the steps of the method 114 may be performed in the order disclosed herein or in any other suitable order. For example, certain steps of the method may be performed concurrently. In addition, in certain embodiments, at least one of the steps of the method 114 may be omitted.

First, as represented by block 116, one or more first sensor signals collectively indicative of a weight of a first storage compartment are received. In addition, one or more second sensor signals collectively indicative of a weight of a second storage compartment are received, as represented by block 118. Furthermore, as represented by block 120, one or more third sensor signals collectively indicative of a weight of the third storage compartment are received. As previously discussed, the sensor signals may be received from respective weight sensors coupled to the respective storage compartments.

As represented by block 122, the weight of the first storage compartment is determined based on the one or more first sensor signals, the weight of the second storage compartment is determined based on the one or more second sensor signals, and the weight of the third storage compartment is determined based on the one or more third sensor signals. In certain embodiments, one or more output signals indicative of the weight of the first storage compartment, the weight of the second storage compartment, the weight of the third storage compartment, or a combination thereof, may be output, as represented by block 124. The one or more output signals may be received by a user interface, and the user interface may present information to a user indicative of the weight(s) of the storage compartment(s).

Furthermore, in certain embodiments, one or more selection signals indicative of whether the third storage compartment is fluidly coupled to the first storage compartment or the third storage compartment is fluidly coupled to the second storage compartment are received, as represented by block 126. As previously discussed, the one or more selection signals may be received from the user interface and/or one or more valve sensors. Next, as represented by block 128, a determination is made regarding whether the third storage compartment is fluidly coupled to the first storage compartment or the third storage compartment is fluidly coupled to the second storage compartment based on the one or more selection signals. As represented by block 130, if the third storage compartment is fluidly coupled to the first storage compartment, the method 114 proceeds to block 132, and if the third storage compartment is fluidly coupled to the second storage compartment, the method 114 proceeds to block 140.

In response to determining the third storage compartment is fluidly coupled to the first storage compartment, a first combined weight of the first storage compartment and the third storage compartment is determined based on the weight of the first storage compartment and the weight of the third storage compartment, as represented by block 132. Next, as represented by block 134, one or more first output signals indicative of the first combined weight and the weight of the second storage compartment are output. The one or more first output signals may be received by a user interface, and the user interface may present information to a user indicative of the first combined weight and the weight of the second storage compartment.

In certain embodiments, a first calibration check may be performed, as represented by block 136. As previously discussed, the first calibration check may include determining a first calibration flow rate of a first agricultural product through a first metering assembly based on a first calibration, and determining a first determined flow rate of the first agricultural product through the first metering assembly based on a change in the first combined weight. The first calibration check may also include determining whether a first difference between the first calibration flow rate and the first determined flow rate is greater than a first threshold value, and outputting a first calibration signal in response to determining the first difference is greater than the first threshold value. The user interface may receive the first calibration signal and, in response, provide an indication to the operator indicative of an undesirable flow rate variation. Furthermore, in certain embodiments, in response to determining the first difference is greater than the first threshold value, the first calibration may be updated based on the first difference, as represented by block 138.

In response to determining the third storage compartment is fluidly coupled to the second storage compartment, a second combined weight of the second storage compartment and the third storage compartment is determined based on the weight of the second storage compartment and the weight of the third storage compartment, as represented by block 140. Next, as represented by block 142, one or more second output signals indicative of the second combined weight and the weight of the first storage compartment are output. The one or more second output signals may be received by a user interface, and the user interface may present information to a user indicative of the second combined weight and the weight of the first storage compartment.

In certain embodiments, a second calibration check may be performed, as represented by block 144. As previously discussed, the second calibration check may include determining a second calibration flow rate of a second agricultural product through a second metering assembly based on a second calibration, and determining a second determined flow rate of the second agricultural product through the second metering assembly based on a change in the second combined weight. The second calibration check may also include determining whether a second difference between the second calibration flow rate and the second determined flow rate is greater than a second threshold value, and outputting a second calibration signal in response to determining the second difference is greater than the second threshold value. The user interface may receive the second calibration signal and, in response, provide an indication to the operator indicative of an undesirable flow rate variation. Furthermore, in certain embodiments, in response to determining the second difference is greater than the second threshold value, the second calibration may be updated based on the second difference, as represented by block 146.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural product storage compartment assembly, comprising:
a first storage compartment configured to couple to a frame, wherein the first storage compartment is configured to provide a first agricultural product to a first metering assembly;
a supplemental storage compartment configured to couple to the frame independently of the first storage compartment;
a second storage compartment configured to couple to the frame independently of the first storage compartment and the supplemental storage compartment, wherein the second storage compartment is configured to provide a second agricultural product to a second metering assembly;
a first flexible link configured to facilitate flow of the first agricultural product from the supplemental storage compartment to the first storage compartment;
a second flexible link configured to facilitate flow of the second agricultural product from the supplemental storage compartment to the second storage compartment;
a first valve configured to selectively block flow of the second agricultural product from the supplemental storage compartment to the first storage compartment while the first valve is closed;
a second valve configured to selectively block flow of the first agricultural product from the supplemental storage compartment to the second storage compartment while the second valve is closed; and
a weight monitoring system, comprising:
one or more first weight sensors coupled to the first storage compartment and configured to couple to the frame, wherein the one or more first weight sensors are configured to output one or more respective first sensor signals collectively indicative of a weight of the first storage compartment;
one or more supplemental weight sensors coupled to the supplemental storage compartment and configured to couple to the frame, wherein the one or more supplemental weight sensors are configured to output one or more respective supplemental sensor signals collectively indicative of a weight of the supplemental storage compartment; and
one or more second weight sensors coupled to the second storage compartment and configured to couple to the frame, wherein the one or more second weight sensors are configured to output one or more respective second sensor signals collectively indicative of a weight of the second storage compartment.

2. The agricultural product storage compartment assembly of claim 1, wherein the first valve comprises a removable panel configured to selectively engage the supplemental storage compartment.

3. The agricultural product storage compartment assembly of claim 1, wherein the first flexible link comprises a flexible duct.

4. The agricultural product storage compartment assembly of claim 1, wherein at least one first weight sensor of the one or more first weight sensors comprises a first load cell, at least one supplemental weight sensor of the one or more supplemental weight sensors comprises a supplemental load cell, or a combination thereof.

5. The agricultural product storage compartment assembly of claim 1, wherein the first flexible link is configured to substantially block airflow from an interface between the first storage compartment and the supplemental storage compartment.

6. The agricultural product storage compartment assembly of claim 1, wherein the first valve is configured to substantially block airflow between the first storage compartment and the supplemental storage compartment while the first valve is closed.

7. A weight monitoring system for an agricultural product storage compartment assembly, comprising:
 a controller having a processor and a memory, wherein the controller is configured to:
  receive one or more first sensor signals collectively indicative of a weight of a first storage compartment of the agricultural product storage compartment assembly;
  receive one or more second sensor signals collectively indicative of a weight of a second storage compartment of the agricultural product storage compartment assembly;
  receive one or more third sensor signals collectively indicative of a weight of a third storage compartment of the agricultural product storage compartment assembly;
  determine the weight of the first storage compartment based on the one or more first sensor signals, determine the weight of the second storage compartment based on the one or more second sensor signals, and determine the weight of the third storage compartment based on the one or more third sensor signals;
  receive one or more selection signals indicative of whether the third storage compartment is fluidly coupled to the first storage compartment or the third storage compartment is fluidly coupled to the second storage compartment;
  determine whether the third storage compartment is fluidly coupled to the first storage compartment or the third storage compartment is fluidly coupled to the second storage compartment based on the one or more selection signals;
  determine a first combined weight of the first storage compartment and the third storage compartment based on the weight of the first storage compartment and the weight of the third storage compartment in response to determining the third storage compartment is fluidly coupled to the first storage compartment, and determine a second combined weight of the second storage compartment and the third storage compartment based on the weight of the second storage compartment and the weight of the third storage compartment in response to determining the third storage compartment is fluidly coupled to the second storage compartment; and
  output one or more first output signals indicative of the first combined weight and the weight of the second storage compartment in response to determining the third storage compartment is fluidly coupled to the first storage compartment, and output one or more second output signals indicative of the second combined weight and the weight of the first storage compartment in response to determining the third storage compartment is fluidly coupled to the second storage compartment.

8. The weight monitoring system of claim 7, comprising a user interface communicatively coupled to the controller, wherein the user interface is configured to receive the one or more first output signals and the one or more second output signals, and the user interface is configured to present an indication of at least one of the first combined weight, the second combined weight, the weight of the second storage compartment, or the weight of the first storage compartment.

9. The weight monitoring system of claim 8, wherein the user interface is configured to output the one or more selection signals in response to user input.

10. The weight monitoring system of claim 7, comprising one or more valve sensors configured to output the one or more selection signals based on a state of a first valve between the first storage compartment and the third storage compartment and a state of a second valve between the second storage compartment and the third storage compartment.

11. The weight monitoring system of claim 7, wherein the controller, in response to determining the third storage compartment is fluidly coupled to the first storage compartment, is configured to:
 determine a first calibration flow rate of a first agricultural product through a first metering assembly based on a first calibration, wherein the first metering assembly is configured to receive the first agricultural product from the first storage compartment;
 determine a first determined flow rate of the first agricultural product through the first metering assembly based on a change in the first combined weight;
 determine whether a first difference between the first calibration flow rate and the first determined flow rate is greater than a first threshold value; and
 output a first calibration signal in response to determining the first difference is greater than the first threshold value; and
 wherein the controller, in response to determining the third storage compartment is fluidly coupled to the second storage compartment, is configured to:
 determine a second calibration flow rate of a second agricultural product through a second metering assembly based on a second calibration, wherein the second metering assembly is configured to receive the second agricultural product from the second storage compartment;
 determine a second determined flow rate of the second agricultural product through the second metering assembly based on a change in the second combined weight;
 determine whether a second difference between the second calibration flow rate and the second determined flow rate is greater than a second threshold value; and
 output a second calibration signal in response to determining the second difference is greater than the second threshold value.

12. The weight monitoring system of claim 11, wherein the controller, in response to determining the third storage compartment is fluidly coupled to the first storage compartment and the first difference is greater than the first threshold value, is configured to update the first calibration based on the first difference; and
 wherein the controller, in response to determining the third storage compartment is fluidly coupled to the second storage compartment and the second difference is greater than the second threshold value, is configured to update the second calibration based on the second difference.

13. An agricultural product storage compartment assembly, comprising:
 a first storage compartment configured to couple to a frame, wherein the first storage compartment is configured to provide a first agricultural product to a first metering assembly;
 a second storage compartment configured to couple to the frame independently of the first storage compartment, wherein the second storage compartment is configured to provide a second agricultural product to a second metering assembly;

a third storage compartment configured to couple to the frame independently of the first storage compartment and the second storage compartment;

a first flexible link configured to facilitate flow of the first agricultural product from the third storage compartment to the first storage compartment;

a second flexible link configured to facilitate flow of the second agricultural product from the third storage compartment to the second storage compartment;

a first valve configured to selectively block flow of the second agricultural product from the third storage compartment to the first storage compartment while the first valve is closed;

a second valve configured to selectively block flow of the first agricultural product from the third storage compartment to the second storage compartment while the second valve is closed; and a weight monitoring system, comprising:
one or more first weight sensors coupled to the first storage compartment and configured to couple to the frame, wherein the one or more first weight sensors are configured to output one or more respective first sensor signals collectively indicative of a weight of the first storage compartment;

one or more second weight sensors coupled to the second storage compartment and configured to couple to the frame, wherein the one or more second weight sensors are configured to output one or more respective second sensor signals collectively indicative of a weight of the second storage compartment;

one or more third weight sensors coupled to the third storage compartment and configured to couple to the frame, wherein the one or more third weight sensors are configured to output one or more respective third sensor signals collectively indicative of a weight of the third storage compartment; and a controller comprising a processor and a memory, wherein the controller is configured to:
receive the one or more first sensor signals from the one or more first weight sensors;
receive the one or more second sensor signals from the one or more second weight sensors;
receive the one or more third sensor signals from the one or more third weight sensors;
determine the weight of the first storage compartment based on the one or more first sensor signals, determine the weight of the second storage compartment based on the one or more second sensor signals, and determine the weight of the third storage compartment based on the one or more third sensor signals; and
output one or more output signals indicative of the weight of the first storage compartment, the weight of the second storage compartment, the weight of the third storage compartment, or a combination thereof.

14. The agricultural product storage compartment assembly of claim 13, wherein the controller is configured to:
receive one or more selection signals indicative of whether the third storage compartment is fluidly coupled to the first storage compartment or the third storage compartment is fluidly coupled to the second storage compartment;
determine whether the third storage compartment is fluidly coupled to the first storage compartment or the third storage compartment is fluidly coupled to the second storage compartment based on the one or more selection signals;
determine a first combined weight of the first storage compartment and the third storage compartment based on the weight of the first storage compartment and the weight of the third storage compartment in response to determining the third storage compartment is fluidly coupled to the first storage compartment, and determine a second combined weight of the second storage compartment and the third storage compartment based on the weight of the second storage compartment and the weight of the third storage compartment in response to determining the third storage compartment is fluidly coupled to the second storage compartment; and
output the one or more output signals indicative of the first combined weight and the weight of the second storage compartment in response to determining the third storage compartment is fluidly coupled to the first storage compartment, and output the one or more output signals indicative of the second combined weight and the weight of the first storage compartment in response to determining the third storage compartment is fluidly coupled to the second storage compartment.

15. The agricultural product storage compartment assembly of claim 14, wherein the weight monitoring system comprises a user interface configured to output the one or more selection signals in response to user input.

16. The agricultural product storage compartment assembly of claim 14, wherein the controller, in response to determining the third storage compartment is fluidly coupled to the first storage compartment, is configured to:
determine a first calibration flow rate of the first agricultural product through the first metering assembly based on a first calibration;
determine a first determined flow rate of the first agricultural product through the first metering assembly based on a change in the first combined weight;
determine whether a first difference between the first calibration flow rate and the first determined flow rate is greater than a first threshold value; and
output a first calibration signal in response to determining the first difference is greater than the first threshold value; and
wherein the controller, in response to determining the third storage compartment is fluidly coupled to the second storage compartment, is configured to:
determine a second calibration flow rate of the second agricultural product through the second metering assembly based on a second calibration;
determine a second determined flow rate of the second agricultural product through the second metering assembly based on a change in the second combined weight;
determine whether a second difference between the second calibration flow rate and the second determined flow rate is greater than a second threshold value; and
output a second calibration signal in response to determining the second difference is greater than the second threshold value.

17. The agricultural product storage compartment assembly of claim 13, wherein the first flexible link comprises a first flexible duct, the second flexible link comprises a second flexible duct, or a combination thereof.

18. The agricultural product storage compartment assembly of claim 13, wherein at least one first weight sensor of the one or more first weight sensors comprises a first load cell, at least one second weight sensor of the one or more second weight sensors comprises a second load cell, at least one third weight sensor of the one or more third weight sensors comprises a third load cell, or a combination thereof.

19. The agricultural product storage compartment assembly of claim 13, wherein the first valve comprises a first removable panel configured to selectively engage the third storage compartment, the second valve comprises a second removable panel configured to selectively engage the third storage compartment, or a combination thereof.

\* \* \* \* \*